United States Patent Office 2,796,888
Patented June 25, 1957

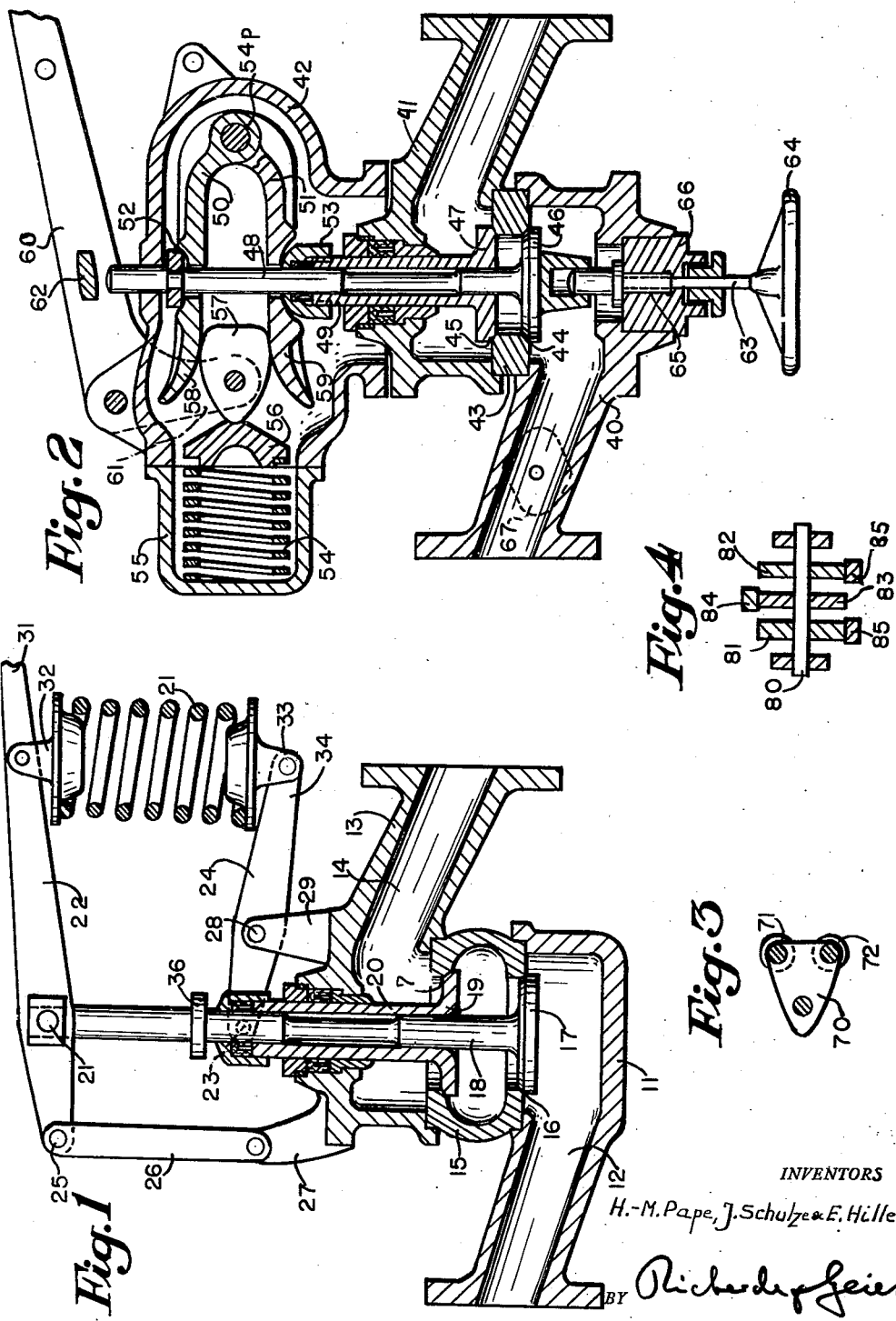

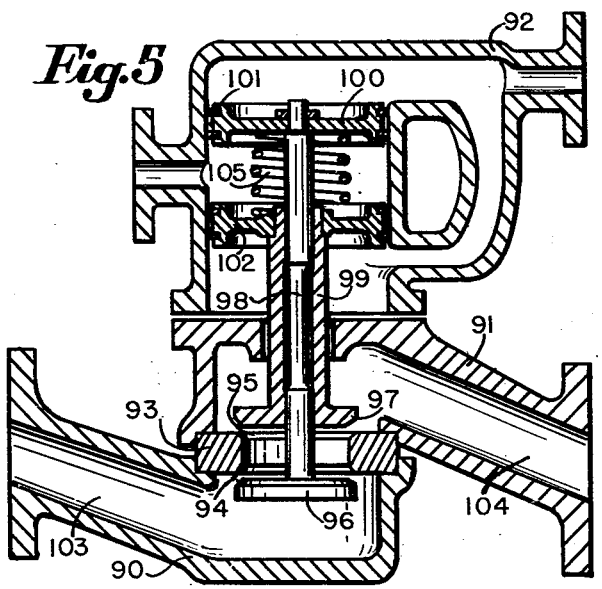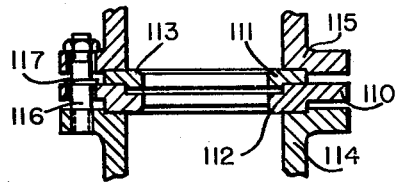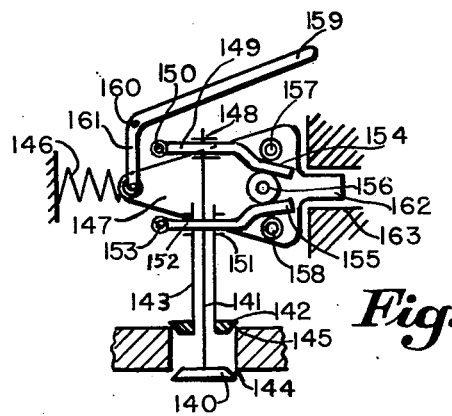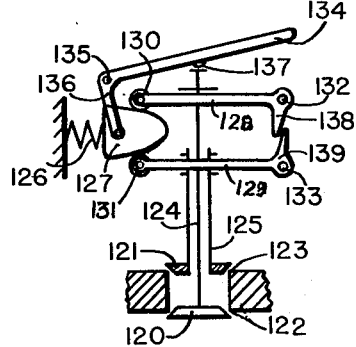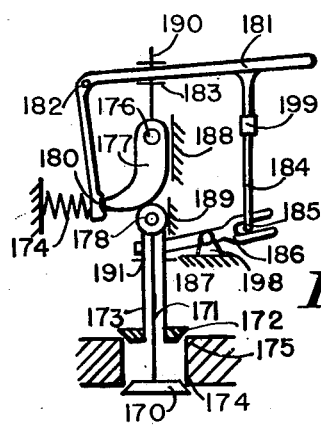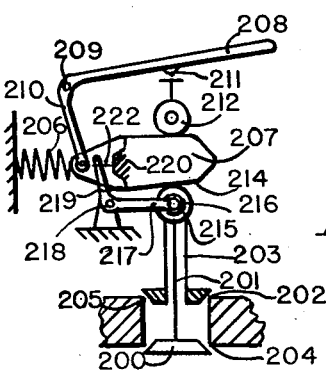

2,796,888

FAST CLOSING VALVE

Hans-Martin Pape, Bremen, Johann Schulze, Osterholz-Scharmbeck, and Emil Hiller, Bremen-Vegesack, Germany, assignors to Gustav F. Gerdts, Bremen, Germany Application September 7, 1951, Serial No. 245,484

10 Claims. (Cl. 137—637.2)

This invention relates to a valve with double-closing means and refers more particularly to a fast-closing valve for use in conjunction with boilers or the like for the removal of slime and other deposits.

An object of the present invention is the provision of a quickly-closing valve which would eliminate the drawbacks of prior art check valves. Heretofore, check valves were actuated by a spring which was located in the main passage of the valve and which was subjected to the action of slime, scale particles and other deposits. The operation of the valve continued only for short periods of time.

Another drawback of prior art constructions was the fact that only a single valve body was used to produce an extremely high pressure required for the airtightness of the valve at normal conditions. When this single-valve body was damaged, the valve leaked and this affected the operation of the boiler most detrimentally. Thus, a further object of the present invention is the construction of a valve which would eliminate all these drawbacks.

Other objects of the present invention will become apparent in the course of the following specification.

In accomplishing the objects of the present invention it was found desirable to provide a quickly operating check valve, such as a wash valve having two valve bodies, located one behind the other and operated by an additional force for closing them. In accordance with the present invention, the source of power required for the closing of the two valve bodies is located outside of the flow passage constituted by the casing of the valve.

According to a preferred embodiment of the invention a single source of power is used to actuate both valve bodies. This results in a particularly simple, effective and inexpensive construction.

The invention will appear more clearly from the detailed description when taken in conjunction with the accompanying drawings showing, by way of example, preferred embodiments of the inventive idea.

In the drawings:

Figure 1 is a section through a valve constructed in accordance with the principles of the present invention.

Figure 2 is a section through a somewhat differently constructed valve.

Figure 3 illustrates a pressure piece.

Figure 4 is a diagram showing the incorporation of a pressure piece with some other valve parts.

Figure 5 illustrates in section a valve of a somewhat different construction.

Figure 6 is a detailed view, in section, of a somewhat differently constructed valve seat.

Figure 7 is a diagram illustrating a somewhat differently constructed valve.

Figure 8 is a diagram illustrating a valve which has a different form.

Figure 9 is a diagram showing a valve of different construction.

Figure 10 is a diagram showing a differently constructed valve.

The quickly closing valve shown in Figure 1 of the drawing comprises a casing 11 having a passage 12 for the fluid. Another casing 13 is provided with a passage 14. A casing body 15 is located between the casings 11 and 13 and is provided with valve seats 16 and 7.

A valve body 17 is connected with a spindle 18 and is used to close and open the valve seat 16. A second valve body 19 is located behind the valve body 17 and is connected with an outer spindle 20 which contains the spindle 18. The second valve body 19 is used to close and open the valve seat 7. It is apparent that the two valve bodies 17 and 19 are subjected not only to the pressure of the fluid passing through the passages 12 and 14 but these valve bodies are also to be subjected to an additional force used to close the two valve seats. In accordance with the present invention this force actuating upon the valve bodies 17 and 19 emanate from a single source of power, namely from a spring 21.

As already stated, the spindle 18 extends through the valve body 19 and also passes through the outer spindle 20. A free end of the spindle 18 extends beyond the spindle 20 and is pivotally connected at 21 with a lever 22. The outer spindle 20 is connected by a pivot 23 with a lever 24. It is apparent that the levers 22 and 24 when actuated in the same direction will close the two valve seats. The lever 22 turns about a pivot 25 which is carried by members 26 and 27 connected to the portion 13 of the valve casing. The lever 24 turns about a pivot 28 carried by a support 29 which constitutes part of the casing 13.

It is apparent that the pivot 25 of the lever 22 is located on the opposite side of the spindles 18 and 20, in relation to the pivot 28 of the second lever 24. The levers 22 and 24 have free ends 30 and 31, respectively, which are located upon the same side of the spindles 18 and 20. The spring 21 has two ends 32 and 33, engaging these free ends 31 and 34 of the two levers 22 and 24.

It is advantageous to construct the lever 22 as the main operating lever. This provides a particularly simple construction which makes it possible to move the two valve bodies 17 and 19 into the opening positions in a simple and most effective manner. The spindle 18 is provided with a stop 36 which is located close to the end of the outer spindle 20. It is apparent that when the lever 22 actuates the spindle 18 the stop or abutment 36 will engage the top end of the outer spindle 20 so that the two valve bodies 17 and 19 will operate simultaneously.

The operation of this valve is apparent from the above description. This valve operates most effectively to provide a secure and complete seal since the force exerted upon the valve bodies 17 and 19 is not affected in any way by the impurities flowing through the valve.

The valve shown in Figure 2 was constructed for the particular purpose of eliminating powerful forces exerted upon the valve closing mechanism as a result of strong back pressure which might prevail in conduits connecting the valve to the boiler. Figure 2 shows a valve having a valve casing consisting of portions 40, 41 and 42. A valve seat 43 is located between the casing portions 40 and 41 and has edges 44 and 45 constituting separate valve seats.

The valve seat 44 is closed and opened by a valve body 46 while the valve seat 45 is closed and opened by a valve body 47. In accordance with the present invention the valve bodies 46 and 47 operate in opposite directions. The valve body 46 is connected with an inner spindle 48 which extends through the valve body 47 and also extends through an outer spindle 49 connected to the valve body 47. The casing portion 42 contains two levers 50 and 51. The lever 50 engages a stop 52 carried by the inner spindle 48. The lever 51 engages a cap 53 which is firmly connected with the outer spindle 49. The two levers 50 and 51 are carried by a common pivot 54p which is mounted in the casing portion 42.

It is apparent that the levers 50 and 51 may have separate pivots, the important feature being that the points of rotation of the two levers are located upon the same side of the spindle 48.

In accordance with the present invention the source of auxiliary power is constituted by a spring 54 which is located within a casing 55 connected to the casing 42. A member 56 connects the spring 54 with pressure piece 57 which engages the ends 58 and 59 of the levers 50 and 51, respectively. It is apparent that the pressure piece 57 has the tendency, under the action of the spring 54, to spread the levers 50 and 51 apart, thereby providing for the closing of the valve.

It is apparent that the casing portions 40 and 41 are substantially the same in structure. Due to this arrangement, the costs of manufacturing the valve are considerably reduced and the mounting of the valve is considerably facilitated. Furthermore, the parts of the valve can easily be removed and replaced. It is advisable to construct the various parts of the valve casing of steel. A valve constructed in this manner provides the greatest possible security against leakage as a result of which the boiler may be caused to run empty without performing any useful work.

The provision of a single piece 43 carrying the two valve seats 44 and 45 has the further advantage that any damage to the valve seats can be easily detected and then the valve seats can be conveniently removed and replaced by new ones. Furthermore, an operator can easily control such seats from the outside.

As shown in Figure 2, the free ends 58 and 59 of the levers 50 and 51 are of a specific curvature. This curvature is so calculated that with an increase in the closing movement of the valve the ratio between the path of the pressure piece and that of the spindles 48 and 49 is progressively increased. As a result of such curvature, the path of movement of the spring 54 and of the pressure piece 57 connected with it may be comparatively small while a very large closing force is produced in the closing positions of the valve bodies 46 and 47.

The main lever 60 of the valve is preferably of an angular form and has a portion 61 which is operatively connected with a pressure piece 57. The lever 60 is provided with a projection 62 which is situated directly above the upper end of the inner spindle 48 and may engage the spindle 48 in the course of the movement of the lever 60. As a result of the operative connection between the pressure piece 57 and the lever 60 through the lever portion 61 a very substantial closing force is exerted upon the valve bodies 46 and 47 when the lever 60 is forcefully operated.

A spindle 63, provided with a hand wheel 64, is used in the event the above described means do not suffice to provide a completely air-tight closure of the valve or in the event of breakage of the spring 54. The spindle 63 has screw threads meshing with corresponding screw threads of an insert 66, carried by the valve casing 40. The spindle 63 may be operated to close the valve seat 44 by means of the valve body 46 and the spindle 48 connected with the valve body 46. In the illustrated inoperative position the spindle 63 in no way interferes with the normal operation of the valve.

The described valve may be used in conjunction with the same connection piece, not only for the periodic slime removal from the boiler but also for the continuous removal of superfluous salts from the boiler. For this purpose the lower casing portion 40 is connected with a pipe piece 67 which leads to a device not shown in the drawing and used for continuous removal of salts from the boiler.

Figure 3 shows a construction wherein the pressure piece 70, serving as a substitute for the pressure piece 57 of Figure 2, is provided with friction-less rollers 71 and 72. These rollers are adapted to slide upon curved surfaces of levers similar in construction to the levers 50 and 51.

While the rollers 71 and 72 of Figure 3 are carried by separate pivots, Figure 4 shows a single axle 80 carrying rollers 81, 82 and 83. In this construction the upper lever 84 corresponds to the lever 50 of Figure 2. The lower lever 85 is substantially bifurcated in construction and corresponds to the lower lever 51 of Figure 2. The lever 84 is so narrow that it will contact only the roller 83 while the bifurcated lever 85 will engage the rollers 81 and 82. In all other respects the construction is the same as shown in Figure 2.

Figure 5 shows a valve having casing portions 90, 91, and 92, with an insert 93 being located between the casing portions 90 and 91. The insert 93 constitutes valve seats 94 and 95, adapted to be closed by valve bodies 96 and 97. The valve body 96 is connected with inner spindle 98, while the valve body 97 is connected with outer spindle 99. In this construction, the valve bodies 96 and 97 operate in opposite directions. The inner spindle 98 is connected with a piston 100, slidable in a cylinder 101, constituting a portion of casing 92. The outer spindle 99 is connected with a piston 102 which is also movable within the cylinder 101. The outer surfaces and the inner surfaces of the two pistons 100 and 102 are operated by means of a multiple-way valve which is not shown in the drawing and which is actuated by the pressure of the boiler or by some other source of power. The pistons 100 and 102 are of such dimensions that the force of the pistons is greater than the force exerted upon the valve bodies 96 and 97 by the fluid flowing through the passages 103 and 104 of the casings 90 and 91. A spring 105 is located between the pistons 100 and 102. Due to the provision of the spring 105, sufficient force is exerted upon the valve bodies 96 and 97 to close the valve seats 94 and 95 even when no pressure is transmitted by the boiler, provided a construction is used wherein boiler pressure actuates the valve. Thus, the spring 105 will close the valve even if no force at all from any other source is exerted upon the valve bodies 96 and 97.

Figure 6 illustrates a casing insert constituting the two valve seats of a valve operating two valve bodies. In the construction shown in Figure 6, the insert consists of two parts 110 and 111. The lower part 110 constitutes a seat 112 for a lower valve body while the upper member 111 constitutes a seat 113 for the upper valve body. In the illustrated construction the connection between the lower insert 110 and the lower casing 114 is independent of the connection between the lower casing 114 and the upper casing 115. This arrangement may be satisfactorily used in conjunction with the construction shown in Figure 2. When, for example, the lower valve body 46 of Figure 2 is closed by means of the spindle 63, the entire upper part of the valve may be conveniently taken apart, cleaned, or removed, despite the fact that the boiler remains in operation. Due to this construction, not only the upper actuating mechanism of the valve, but also the upper casing 115 along with the upper valve body, may be conveniently removed, cleaned, replaced or otherwise treated. In accordance with the construction shown in Figure 6, this is attained by the use of bolts 116 which connect the casings 114 and 115 and which are provided with collars 117. Due to the provision of these collars, the lower portion 110 of the insert can be pressed against the lower casing 114 and will remain in firm engagement with the casing although the upper casing 115 along with the upper insert 111 are removed for cleaning purposes.

In the construction shown in Figure 2, which has a lever 60 and two valve bodies 46 and 47 movable in opposite direction, the upper valve body 47 connected to the hollow spindle 49 is opened only by the pressure of the flowing liquid. This construction may be somewhat detrimental when pressure is small, for example, when a boiler which has no pressure is being emptied or when there is a substantial resistance to the movement of the device. That can happen, for example, when there are large scale deposits.

Figure 7 shows a construction wherein the opening movement of the upper valve body is secured under all circumstances.

The valve shown diagrammatically in Figure 7 includes a lower valve body 120 and an upper valve body 121, the two valve bodies being movable in opposite directions to close the valve seats 122 and 123, respectively. The valve body 120 is connected with an inner spindle 124, while the valve body 121 is connected with an outer spindle 125. Spring 126 is connected with a pressure piece 127 and is used to actuate the valve bodies 120 and 121 by means of levers 128 and 129. The action of spring 126 is to move both valve bodies to their closing position. The lever 128 carries at its outer end a roller 130 which engages a surface of the pressure piece 127. Similarly, the lever 129 carries a roller 131 which engages on the opposite surface or edge of the pressure piece 127. The lever 128 is pivoted at 132 while the lever 129 is pivoted at 133. It is apparent that the two pivots 132 and 133 are located upon the same side of the spindles 124 and 125. The main operating lever 134 of the valve is pivoted at 135 and is provided with an arm 136 which is connected to the pressure piece 127. The lever 134 carries a projection or abutment 137 which may engage the top of the spindle 124. It is apparent that due to this arrangement a downward movement of the lever 134 will tend to open the valve.

In order to provide additional security for the opening movement of the upper valve body 121, the lever 128 is provided with an arm or extension 138 which extends downwardly and which is located adjacent to an arm or extension 139 of the lever 129. The arm 139 extends upwardly and close to the arm 138. It is apparent that the arrangement of the arms 138 and 139 is such that when the lower valve body 120 moves downwardly and the lever 128 is turned accordingly, the lower lever 129 will be turned in the opposite direction by the engagement of the arms 138 and 139. This will cause the hollow outer spindle 125 to move upwardly so that the upper valve body 121 will be raised from the valve seat 123.

A somewhat different construction is illustrated in Figure 8 of the drawing. The valve shown therein includes a lower valve body 140 connected to an inner spindle 141. The upper valve body 142 is connected to an outer hollow spindle 143. The valve body 140 is used to open and close the valve seat 144 while the valve body 142 opens or closes the valve 145. The auxiliary source of power is provided by a spring 146 which is connected to a comparatively large pressure piece 147. The inner spindle 141 is connected by an adjustable member 148 with a lever 149 which is pivoted at 150. Similarly, the outer spindle 143 is connected by a member 151 with a lever 152 which is pivoted at 153. The levers 149 and 152 are provided with curved free ends 154 and 155, respectively. These ends may engage a middle roller 156 or two end rollers 157 and 158, which are mounted upon the pressure piece 147. The arrangement is such that an outwardly directed pressure of the spring 146 will move the levers 149 and 152 outwardly, thereby tending to close the valve seats 144 and 145 by means of the valve bodies 140 and 142.

An operating lever 159 is pivoted at 160 and is connected by an arm 161 with the pressure piece 157. It is apparent that when the operating lever 159 is moved downwardly, the rollers 157 and 158 will engage the curved ends 154 and 155 of the levers 149 and 152 and will swing these levers towards each other, with the result that the valve bodies 140 and 142 will be moved to their opening positions.

The pressure piece 147 has a projection 162 located at the outer end thereof and movable with small play in a horizontal guide 163 which may constitute a part of the valve casing. On the other hand, the guide 163 may be adjustable vertically in relation to the casing. Due to this arrangement, the two valve bodies 140 and 142 are not moved one after the other but are moved substantially simultaneously. Furthermore, this guide 163 prevents the shifting of the pressure piece 147 into an excessively inclined position since this could create undesirably strong forces acting upon the spindles 141 and 143, particularly while these members are moved throughout their intermediate positions.

Figure 9 is is a digram illustrating a different valve construction. This valve has a lower valve body 170 which is connected to an inner spindle 171. An upper valve body 172 is connected to an outer spindle 173. The valve bodies 170 and 172 serve to close or open the valve seats 174 nad 175. The inner spindle 171 carries a pivot 176. A swingable cam body 177 is mounted upon the pivot 176. The outer hollow spindle 173 carries a roller 178 which may engage curved surfaces of the cam body 177. The auxiliary force is provided in this construction by a spring 179 which presses against the cam body 177 through the medium of an end portion 180 of the main operating lever 181.

The lever 181 is pivoted at 182 and engages a member 183 adapted to engage and to establish operative connection with the inner spindle 171. When the operating lever 181 is moved downwardly, the arm 180 will compress the spring 179 while the member 183 will move downwardly the inner spindle 171, thereby raising the lower valve body 170 off the valve seat 174. The operating lever 181 is provided with an extension 184 which carries a pin 185 projecting in the bifurcated end of a lever 186. The lever 186 is pivoted at 187 and has another end which may engage the outer spindle 173. Due to this arrangement, a downward movement of the operating lever 181 will be transmitted through the members 184, 185 and 186 to the outer spindle 173 so that the inner valve body 172 will be raised off the valve seat 175 at the same time. It is advisable to provide guides 188 and 189 for the guiding of the members 177 and 178 and/or for the guiding of the pivots carrying these members. The purpose of the guides 188 and 189 is to relieve side pressure upon the spindles 171 and 173. It is also possible to provide upon the spindles 171 and 173 stops 190 and 191, respectively, which will cause the spindle 177 to move upwardly when the lever 181 is moved upwardly. However, it is necessary to provide sufficient play so that at the end of the closing movements the member 177 can be free, namely so that it can have a toggle lever action and thereby produce great forces serving to press the valve bodies against the valve seats. As a result of this arrangement the shape of the member 177 can be varied to a considerable extent.

Another advantage of this construction is that the two valve bodies can move only simultaneously and not one after the other. Furthermore, this construction eliminates the great turning moments of prior art devices.

The construction illustrated in Figure 10 presents the same advantages. This construction shows a lower valve body 200 having an inner spindle 201 and an upper valve body 202 connected to an outer valve spindle 203. The valve body 200 and valve body 202 are used to close and open the valve seats 204 and 205, respectively. The additional source of power is constituted by the spring 206 which is connected to a pressure piece 207. The operating lever 208 is pivoted at 209 and is connected by an arm 210 with the pressure piece 207 and spring 206. The operating lever 208 carries a projection 211 adapted to engage the top of the inner spindle 201.

In accordance with the present invention the pressure piece 207 has horizontally or substantially horizontally extending edges 213 which are adapted to engage a roller 212 carried by the inner spindle 201. The pressure piece 207 also has an inner edge 214 which extends at an angle to the upper edge 213 so that the piece 207 has essentially the shape of a wedge. The lower edge 214 engages a roller 215 mounted upon a pivot 216 which is carried by the outer hollow spindle 203. Preferably the position of the pivot 216 upon the spindle 203 may be shifted or varied by any suitable means not shown in the drawing. The pivot 216 is connected with a two-armed lever 217 which is pivoted at 218 to the casing of the valve. The two-armed lever 217 has two arms extending substantially at a right angle. The arm 219 of the lever 217 is located close to the projection 220 carried by the pressure piece 207 and is also located close to the pivot 221 connecting the arm 210 of the lever 208 with the pressure piece 207.

It is apparent that when the operating lever 208 is swung downwardly, the projection 211 will engage the inner spindle 201 and thereby cause the valve body 200 to be raised off the valve seat 204. At the same time the arm 210 of the lever 208 will move the pressure piece 207 in the direction toward the spring 206, causing the projection 220 to strike the arm 219 of the lever 217 and thereby causing the lever 217 to swing about its pivot 218 and to move upwardly the outer spindle 203 and the valve body 202 connected therewith. Thus, both valve bodies will be raised off the valve seats.

The fact that the edge 213 of the pressure piece 207 extends horizontally has the advantage that close to the closing position and in the closing position itself, in which, as above stated, the largest forces have to be exerted upon and by the valve bodies, the inner spindle 201 is not subjected to any side pressure. Therefore, in this construction it is not necessary to provide any side guides for the pivot of the roller 212. It is still necessary, however, to provide a side guide for the pivot 216 carrying the lower roller 215. However, this side guide in accordance with the described construction is combined with an angular lever 217, thereby facilitating and improving the construction to a great extent.

As already stated, the end 219 of the lever 217 is located between two stops constituted by the projection 220 and the pivot 221. Furthermore, the pivot 221 in addition to serving as a stop for the arm 219 also serves as a connection between the arm 210 and the piece 207. This construction in its entirety creates again the advantageous result that the two valve bodies 200 and 202 are moved substantially simultaneously. The parts have sufficient play so that the wedge-shaped form of the pressure piece 207 can operate without hindrance.

In these described constructional examples the precise positioning and any required subsequent adjustment of the pressure piece, such as the pressure piece 207 of Figure 10 or of the cam body 177 of Figure 9, is attained by the fact that the members transmitting the closing forces exerted by the operational lever upon the inner spindle, such as the member 183 and 190 of Figure 9, is axially shiftable upon the inner spindle by means of screw threads not shown in the drawing.

The adjustment or the positioning of the upper valve body 202 can be secured by means of a seat screw 222 indicated diagrammatically in Figure 10. In the construction shown in Figure 9, this adjustment can be attained by changing the length of the arm 184 carried by the operating lever 181. This may be conveniently attained through the use of a threaded sleeve 199 which may be constructed to carry two ends of the arm and the turning of which may cause a change in the operative length of the arm 184 as a whole. The same results may be obtained by constructing the support 198 of the pivot 187 in the form of an adjustable eccenter. It is apparent that many other variations and modifications may be made in the described examples without exceeding the scope of the present invention. All such variations and modifications are to be considered as being included within the scope of the present invention.

What is claimed is:

1. A fast closing valve for slime removal and the like, comprising, in combination, a double valve comprising a valve casing constituting a flow passage and having two valve seats located one behind the other in a single flow path, two valve bodies for said valve seats for closing and opening said double valve, an inner spindle connected with one of said valve bodies, an outer hollow spindle connected with the other one of said valve bodies, said other valve body having a passage formed therethrough, said inner spindle extending through said passage and said outer spindle, means connected with said spindles for actuating said valve bodies, and additional power means connected with said spindles for actuating said valve bodies for closing said double valve and located outside of said flow passage.

2. A fast closing valve for slime removal and the like, comprising, in combination, a double valve comprising a valve casing constituting a flow passage and having two valve seats located one behind the other, two valve bodies for said valve seats for closing and opening said double valve, an inner spindle connected with one of said valve bodies, an outer hollow spindle connected with the other one of said valve bodies, said other valve body having a passage formed therethrough, said inner spindle extending through said passage and said outer spindle, a lever connected with said inner spindle, another lever connected with said outer spindle, a single pivot for the two levers, said levers having free end portions extending on the same side of said spindles, a pressure piece engaging said free end portions, and a spring engaging said pressure piece to press it against said end portions, said levers actuating said spindles in opposite directions to cause said valve bodies to close said double valve.

3. A fast closing valve for slime removal and the like, comprising, in combination, a double valve comprising a valve casing constituting a flow passage and having two valve seats located one behind the other, two valve bodies for said valve seats for closing and opening said double valve, an inner spindle connected with one of said valve bodies, an outer hollow spindle connected with the other one of said valve bodies, said other valve body having a passage formed therethrough, said inner spindle extending through said passage and said outer spindle, a lever connected with said inner spindle, another lever connected with said outer spindle, a single pivot for the two levers, said levers having free curved end portions extending on the same side of said spindles, a pressure piece engaging said free end portions, and a spring engaging said pressure piece to press it against said end portions, said levers actuating said spindles in opposite directions to cause said valve bodies to close said double valve, the curvatures of said end portions being such that with an increase in the closing movement the ratio between the path of the pressure piece and that of the spindles is progressively increased.

4. A fast closing valve for slime removal and the like, comprising, in combination, a double valve comprising a valve casing constituting a flow passage and having two valve seats located one behind the other, two valve bodies for said valve seats for closing and opening said double valve, an inner spindle connected with one of said valve bodies, an outer hollow spindle connected with the other one of said valve bodies, said other valve body having a passage formed therethrough, said inner spindle extending through said passage and said outer spindle, a lever connected with said inner spindle, another lever connected with said outer spindle, a single pivot for the two levers, said levers having free end portions extending on the same side of said spindles, a pressure piece engaging said free end portions, a spring engaging said pressure piece to press it against said end portions, said levers actuating said spindles in opposite directions to cause said valve bodies to close said double valve, and a main two-armed operating lever having one arm connected with said pressure piece, and a projection carried by the other arm and adapted to engage and operate said inner spindle.

5. A fast closing valve for slime removal and the like, comprising, in combination, a double valve comprising a valve casing constituting a flow passage and having two valve seats located one behind the other, two valve bodies for said valve seats for closing and opening said double valve, an inner spindle connected with one of said valve bodies, an outer hollow spindle connected with the other one of said valve bodies, said other valve body having a passage formed therethrough, said inner spindle extending through said passage and said outer spindle, a lever connected with said inner spindle, another lever connected with said outer spindle, pivots for said levers, said pivots being located upon the same side of said spindles, said levers having free end portions extending on the other side of said spindles, rollers carried by said end portions of the levers, a spring, a pressure piece engaged by said spring and pressed by said spring against said rollers, an operating lever having an arm operatively connected with said pressure piece and a projection adapted to engage said inner spindle, and arms carried by the two first-mentioned levers and extending toward and next to each other, whereby the swinging of one of the two first-mentioned levers in one direction causes the swinging of the other lever in the opposite direction.

6. A fast closing valve for slime removal and the like, comprising, in combination, a double valve comprising a valve casing constituting a flow passage and having two valve seats located one behind the other, two valve bodies for said valve seats for closing and opening said double valve, an inner spindle connected with one of said valve bodies, an outer hollow spindle connected with the other one of said valve bodies, said other valve body having a passage formed therethrough, said inner spindle extending through said passage and said outer spindle, a lever connected with said inner spindle, another lever connected with said outer spindle, pivots for said levers, said pivots being located upon the same side of said spindles, said levers having curved end portions extending on the other side of said spindles, a spring, a pressure piece engaged by said spring, a roller carried by said pressure piece for engaging said curved end portions to move said levers away from each other when said spring moves said pressure piece, an operating lever having an arm operatively connected with said pressure piece, other rollers carried by said pressure piece for engaging said curved end portions to move the two first-mentioned levers toward each other when said pressure piece is moved toward said spring by the operating lever, a projection carried by said pressure piece, and a substantially horizontal guide for said projection.

7. A fast closing valve for slime removal and the like, comprising, in combination, a double valve comprising a valve casing constituting a flow passage and having two valve seats located one behind the other, two valve bodies for said valve seats for closing and opening said double valve, an inner spindle connected with one of said valve bodies, an outer hollow spindle connected with the other one of said valve bodies, said other valve body having a passage formed therethrough, said inner spindle extending through said passage and said outer spindle, a cam body rotatably mounted upon said inner spindle and having a curved portion, a roller carried by said outer spindle and engaging said curved portion of the cam body, a spring, an operating lever having an arm interposed between said spring and said cam body and adapted to transmit the pressure of said spring to said cam body, said operating lever further having a projection adapted to engage said inner spindle, a two-armed lever having one end adapted to be connected with said outer spindle, and means operatively connecting said operating lever with the other arm of said two-armed lever.

8. A fast closing valve for slime removal and the like, comprising, in combination, a double valve comprising a valve casing constituting a flow passage and having two valve seats located one behind the other, two valve bodies for said valve seats for closing and opening said double valve, an inner spindle connected with one of said valve bodies, an outer hollow spindle connected with the other one of said valve bodies, said other valve body having a passage formed therethrough, said inner spindle extending through said passage and said outer spindle, a cam body rotatably mounted upon said inner spindle and having a curved portion, a roller carried by said other spindle and engaging said curved portion of the cam body, a spring, an operating lever having an arm interposed between said spring and said cam body and adapted to transmit the pressure of said spring to said cam body, said operating lever further having a projection adapted to engage said inner spindle, a two-armed lever having one end adapted to be connected with said outer spindle, means operatively connecting said operating lever with the other arm of said two-armed lever, a member operatively connecting said inner spindle with said operating lever when said operating lever is moved upwardly, and a member connecting said outer spindle with said two-armed lever when said operating lever is moved upwardly.

9. A fast closing valve for slime removal and the like, comprising, in combination, a double valve comprising a valve casing constituting a flow passage and having two valve seats located one behind the other, two valve bodies for said valve seats for closing and opening said double valve, an inner spindle connected with one of said valve bodies, an outer hollow spindle connected with the other one of said valve bodies, said other valve body having a passage formed therethrough, said inner spindle extending through said passage and said outer spindle, a roller carried by said inner spindle, another roller carried by said outer spindle, a pressure piece having a substantially horizontal edge engaged by the first-mentioned roller and another inclined edge engaged by the second-mentioned roller, a spring engaging said pressure piece to press it against said rollers, an angular two-armed lever having an arm connected with the second-mentioned roller, a projection carried by said pressure piece and adapted to engage the other arm of the two-armed lever, and a main two-armed operating lever having one arm connected with said pressure piece, and a projection carried by the other arm and adapted to engage and operate said inner spindle.

10. A fast closing valve for slime removal and the like, comprising, in combination, a double valve comprising a valve casing constituting a flow passage and having two valve seats located one behind the other, two valve bodies for said valve seats for closing and opening said double valve, an inner spindle connected with one of said valve bodies, an outer hollow spindle connected with the other one of said valve bodies, said other valve body having a passage formed therethrough, said inner spindle extending through said passage and said outer spindle, a roller carried by said inner spindle, another roller carried by said outer spindle, a pressure piece having a substantially horizontal edge engaged by the first-mentioned roller and another inclined edge engaged by the second-mentioned roller, a spring engaging said pressure piece to press it against said rollers, an angular two-armed lever having an arm connected with the second-mentioned roller, a projection carried by said pressure piece, a pivot carried by said pressure piece, and a main two-armed operating lever having one arm mounted upon said pivot, and a projection carried by the other arm and adapted to engage and operate said inner spindle, the other arm of the angular two-armed lever extending between said pivot and said projection and being adapted to be engaged selectively by said pivot and said projection.

References Cited in the file of this patent

UNITED STATES PATENTS

| | | |
|---|---|---|
| 551,473 | Perkins | Dec. 17, 1895 |
| 591,015 | Schreidt | Oct. 5, 1897 |
| 910,213 | Mickesch | Jan. 19, 1909 |
| 997,862 | Shearer | July 11, 1911 |
| 1,315,387 | Murphy | Sept. 9, 1919 |
| 1,617,711 | Hennebohle | Feb. 15, 1927 |
| 1,855,362 | Parsons | Apr. 26, 1932 |
| 1,884,458 | Willenborg | Oct. 25, 1932 |
| 1,949,177 | Otto | Feb. 27, 1934 |
| 1,957,082 | Schneible | May 1, 1934 |
| 2,301,976 | Schellens | Nov. 17, 1942 |
| 2,404,924 | Sacchini | July 30, 1946 |
| 2,587,539 | Seaman | Feb. 26, 1952 |
| 2,613,683 | Baird | Oct. 19, 1952 |